US009506806B2

(12) United States Patent
Sano

(10) Patent No.: US 9,506,806 B2
(45) Date of Patent: Nov. 29, 2016

(54) POLARIZATION INFORMATION ACQUISITION UNIT, IMAGE PICKUP APPARATUS INCLUDING THE SAME, POLARIZATION INFORMATION ACQUISITION METHOD, AND NON-TRANSITORY COMPUTER-READABLE STORAGE MEDIUM

(71) Applicant: CANON KABUSHIKI KAISHA, Tokyo (JP)

(72) Inventor: Daisuke Sano, Moka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 14/643,926

(22) Filed: Mar. 10, 2015

(65) Prior Publication Data

US 2015/0253192 A1   Sep. 10, 2015

(30) Foreign Application Priority Data

Mar. 10, 2014   (JP) ................ 2014-046131

(51) Int. Cl.
*G01J 4/00*        (2006.01)
*G01J 4/04*        (2006.01)
(Continued)

(52) U.S. Cl.
CPC .. *G01J 4/04* (2013.01); *G01J 4/02* (2013.01); *G02B 5/3083* (2013.01); *G01J 2004/002* (2013.01)

(58) Field of Classification Search
CPC .............. G02B 27/56; G02B 2006/12147; G02B 6/1228; G02B 1/00; G02B 1/113; G02B 1/115; G02B 1/118; G02B 2006/12061; G02B 2006/12097; G02B 2207/101; G02B 6/125; G02B 1/002; G02B 2006/12123; G02B 6/12
See application file for complete search history.

(56) References Cited

U.S. PATENT DOCUMENTS 5,416,324 A *  5/1995  Chun .................... G06K 9/209
                                                   250/332
6,563,582 B1 *  5/2003  Chun ................... G02B 5/1814
                                                   250/332
(Continued)

FOREIGN PATENT DOCUMENTS

JP    2002-116085 A    4/2002
JP    2005-114704 A1   4/2005
(Continued)

OTHER PUBLICATIONS

Yoneyama et al. "Simultaneous Acquisition of Phase-stepped Fringes Using a Pixelated Micro-retarder Array", Journal of the Japanese Society for Experimental Mechanics, vol. 6, Sep. 2006, pp. 275 to 281, Japanese Society for Experimental Mechanics, Japan. English abstract of article provided.

*Primary Examiner* — Michael P Stafira

(74) *Attorney, Agent, or Firm* — Rossi, Kimms & McDowell LLP

(57) ABSTRACT

An polarization information acquisition unit includes a phase adjuster configured to adjust phases of two linearly polarized components of incident light, which oscillate in directions orthogonal to each other, a detector configured to transmit a polarized component oscillating in one direction and not to transmit a polarized component oscillating in a direction orthogonal to the one direction, the polarized components being included in light emitted from the phase adjuster, and a photoelectric convertor configured to photo-electrically convert a polarized component transmitted through the detector. The phase adjuster has at least three areas. The at least three areas include at least two areas having phase adjusting amounts different from each other, and at least two areas having an identical phase adjusting amounts and having slow axes whose directions are different from each other by 20 to 90 degrees inclusive.

18 Claims, 10 Drawing Sheets

(51) Int. Cl.
 *G02B 5/30* (2006.01)
 *G01J 4/02* (2006.01)

(56) References Cited

U.S. PATENT DOCUMENTS

2007/0268490 A1 11/2007 Kawakami et al.
2012/0188358 A1* 7/2012 Kimura .............. G02B 21/0092
 348/79

FOREIGN PATENT DOCUMENTS

| JP | 2005-221620 A | 8/2005 |
| JP | 2009-186255 A | 8/2009 |
| JP | 4974543 B2 | 7/2012 |

* cited by examiner

| INCIDENT POLARIZATION LIGHT | POST-PHASE ADJUSTMENT | OUTPUT |
|---|---|---|
| ↔ X=0 Y=10 | ↻ ↕<br>↕ ↻ | 7 7<br>0 0 |
| ↻ X:Y=10:10 | ↕ ↻<br>↔ ↻ | 14 0<br>10 10 |

| INCIDENT POLARIZATION LIGHT | POST-PHASE ADJUSTMENT | OUTPUT |
|---|---|---|
| ↕ X=10 Y=0 | ↻ ↻<br>↻ ↔ | 7 7<br>10 10 |
| ↻ X:Y=10:10 | ↔ ↻<br>↕ ↻ | 0 14<br>10 10 |

FIG. 4

| INCIDENT POLARIZATION LIGHT | DETECTING DIRECTION | OUTPUT | INCIDENT POLARIZATION LIGHT | DETECTING DIRECTION | OUTPUT |
|---|---|---|---|---|---|
| ↔ X=0 Y=10 | ↕ ⤢ ↔ ⤡ | 10 0 7 7 | ↕ X=10 Y=0 | ↕ ⤢ ↔ ⤡ | 0 10 7 7 |
| ↻ X:Y=10:10 | ↕ ⤢ ↔ ⤡ | 10 10 10 10 | ↻ X:Y=10:10 | ↕ ⤢ ↔ ⤡ | 10 10 10 10 |

| INCIDENT POLARIZATION LIGHT | PHASE MODULATOR | DETECTOR | INCIDENT POLARIZATION LIGHT | PHASE MODULATOR | DETECTOR |
|---|---|---|---|---|---|
| ↔  X=0  Y=10 | ○ ○ ↗ ↔ | 7.8 7.8  2.6 8.7 | ↕  X=10  Y=0 | ○ ○ ↔ ↕ | 6.0 6.0  9.6 5.0 |
| ↗  X:Y=10:10 | ○ ○ ↔ ↕ | 8.4 8.4  13.7 13.7 | ↗  X:Y=10:10 | ○ ○ ↔ ↕ | 5.3 5.3  3.7 3.7 |
| ○  X:Y=10:10 | ↕ ↔ ○ ○ | 13.7 3.7  10.0 10.0 | ○  X:Y=10:10 | ↔ ↕ ○ ○ | 3.7 13.7  10.0 10.0 |

POLARIZATION INFORMATION ACQUISITION UNIT, IMAGE PICKUP APPARATUS INCLUDING THE SAME, POLARIZATION INFORMATION ACQUISITION METHOD, AND NON-TRANSITORY COMPUTER-READABLE STORAGE MEDIUM

BACKGROUND OF THE INVENTION

Field of the Invention

The present invention relates to a polarization information acquisition unit that acquires polarization information.

Description of the Related Art

Polarization information of polarized light, whose oscillating direction changes by a reflection on an object and a transmission through an object, is useful for the evaluation and examination of the object. Japanese Patent No. 4974543 discloses a polarization imaging apparatus that includes a stack of a periodic structure on pixels and a dielectric multi-layered film thereon which serve as a polarizer that transmits polarized light corresponding to the orientation of the periodic structure. This polarization imaging apparatus can two-dimensionally acquire polarization information of an incident light flux. Japanese Patent Laid-open No. 2005-221620 discloses a polarization conversion device that changes the state of incident polarization light into an arbitrary state by arranging half-wave plates and quarter-wave plates in series and by rotating each component to reproduce a desired polarization state. "Simultaneous Acquisition of Phase-stepped Fringes Using a Pixelated Micro-retarder Array", Satoru Yoneyama et al., Journal of the Japanese Society for Experimental Mechanics, Japanese Society for Experimental Mechanics, September 2006, Vol. 6, pp. 275 to 281, discloses a method of performing a phase analysis on an interference pattern and a photoelastic fringe based on an image obtained by single image capturing by arranging a phase plate array and a uniform polarizer on pixels.

However, the polarizer disclosed in Japanese Patent No. 4974543 transmits only linear polarization light and thus cannot detect circular polarization light, for example. The polarization conversion device disclosed in Japanese Patent Laid-open No. 2005-221620 can acquire circular polarization light, but this acquisition is time-divisional and requires a rotation. Therefore, it takes a long time to acquire the polarization information. The method disclosed in Yoneyama et al. has low detection accuracies of linear polarization light and phase information.

SUMMARY OF THE INVENTION

The present invention provides a polarization information acquisition unit, an image pickup apparatus, a polarization information acquisition method, and a non-transitory computer-readable storage medium, which can quickly, statically (that is, without driving a polarizer, for example), and accurately acquire polarization information (phase and intensity) of linear polarization light and circular polarization light.

A polarization information acquisition unit according to the present invention is configured to acquire polarization information of incident light. The polarization information acquisition unit includes a phase adjuster configured to adjust phases of two linearly polarized components of the incident light, which oscillate in directions orthogonal to each other, a detector configured to transmit a polarized component oscillating in one direction and not to transmit a polarized component oscillating in a direction orthogonal to the one direction, the polarized components being included in light emitted from the phase adjuster, and a photoelectric convertor configured to photoelectrically convert a polarized component transmitted through the detector. The phase adjuster has at least three areas. The at least three areas include at least two areas having phase adjusting amounts different from each other, and at least two areas having an identical phase adjusting amounts and having slow axes whose directions are different from each other by 20 to 90 degrees inclusive.

Further features of the present invention will become apparent from the following description of exemplary embodiments with reference to the attached drawings.

BRIEF DESCRIPTION OF THE DRAWINGS

FIG. 4 illustrates a relationship between polarization light fluxes entering and emitted from the phase adjuster illustrated in FIG. 3 according to Embodiment 1.

FIG. 6 illustrates an analysis direction and output of polarization light incident on a detector in the sensor illustrated in FIG. 5.

FIG. 9 illustrates a relationship between polarization light fluxes incident on and emitted from the phase adjuster illustrated in FIG. 8 according to Embodiment 2.

DESCRIPTION OF THE EMBODIMENTS

Figure 1:
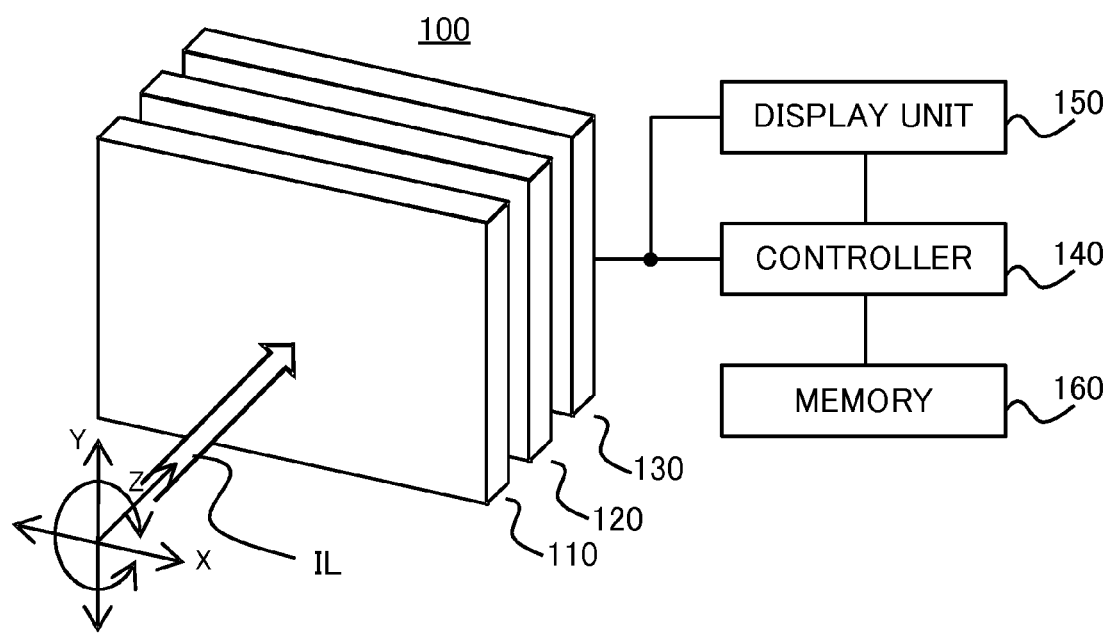
FIG. 1 is a schematic perspective diagram of a sensor (polarization information acquisition unit) according to Embodiments 1 and 2 of the present invention.

FIG. 1 is a schematic perspective diagram of a sensor (polarization information acquisition unit) 100 according to an embodiment of the present invention. This embodiment sets a working wavelength λ of incident light IL to that of visible light or near-infrared light, but the working wavelength λ is not limited to this embodiment.

In FIG. 1, the sensor 100 includes, in order from the incident side of the incident light IL, a phase adjuster 110, a detector 120, and a photoelectric convertor 130. The sensor 100 may further include a controller 140, a display unit 150, and a memory 160.

FIG. 1 defines an X axis and a Y axis along an imaging plane of the photoelectric convertor 130 and defines a Z axis as a direction orthogonal to the X and Y axes. The incident light IL travels in the Z axis and has a variety of polarization directions, and the sensor 100 is configured to acquire polarization information of the incident light. The Z direction is aligned with an optical axis direction.

The phase adjuster 110 is a plate that adjusts phases of two linearly polarized components (X-polarized component and Y-polarized component in FIG. 1) of the incident light IL, which oscillate in directions orthogonal to each other.

Figure 2A:
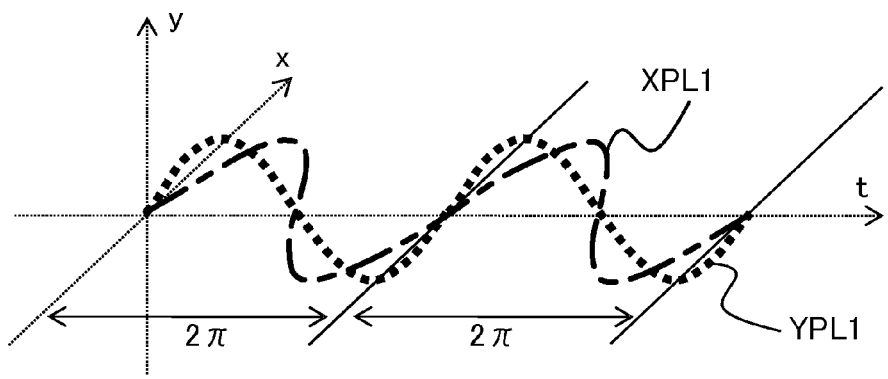
FIGS. 2A to 2D illustrate propagations and oscillations of linear polarized light, and propagations and oscillations of a counterclockwise circular polarization light.
Figure 2B:
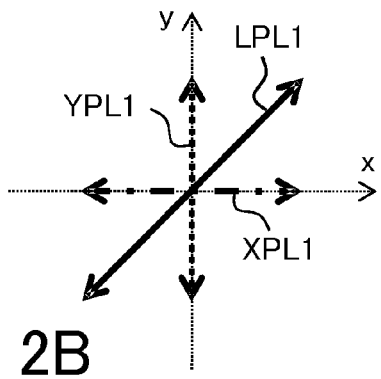
Figure 2C:
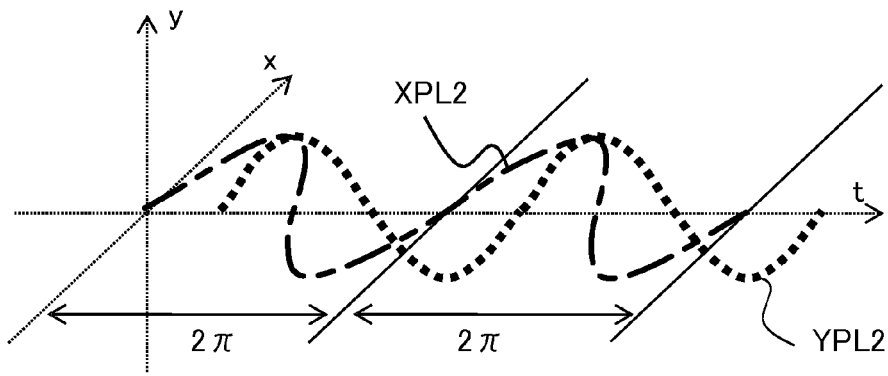
Figure 2D:
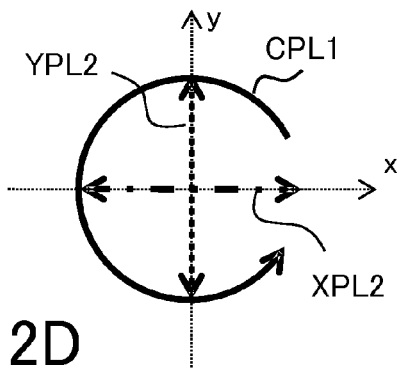

When the phase adjuster 110 is a quarter-wave plate, as illustrated in FIGS. 2A to 2D, the incident light IL as linear polarization light is converted into circular polarization light through the phase adjuster 110. FIGS. 2A and 2B illustrate the incident light, and FIGS. 2C and 2D illustrate the emitted circular polarization light. FIGS. 2A and 2C are perspective views illustrating shift amounts between polarized components oscillating in the X and Y directions with time t. FIG. 2B illustrates oscillating directions of the polarized component illustrated in FIG. 2A. FIG. 2D illustrates oscillating directions of the polarized component illustrated in FIG. 2C. In FIGS. 2A to 2D, XPL1 and XPL2 represent X-polarized components oscillating in the X direction, and YPL1 and YPL2 represent Y-polarized components oscillating in the Y direction. LPL1 represents linear polarization light obtained by synthesizing the polarized components oscillating in the X and Y directions, and CPL1 represents circular polarization light. The linear polarization light LPL1 oscillates in a direction angled at 45 degrees with respect to the X axis.

The detector 120 includes a polarizer that transmits an incident light polarized component oscillating in one direction and does not transmits an incident light polarized component oscillating in a direction orthogonal to the one direction, but may transmit an incident light polarized component oscillating in a direction somewhat different from the one direction. The oscillating direction of the polarized component transmitted through the detector 120 has a likelihood that depends on an element configuration. The detector 120 does not transmit but reflects or absorbs the polarized component oscillating in a direction orthogonal to the polarized component thus transmitted.

The photoelectric convertor 130 has a plurality of photoelectric conversion areas (hereinafter, also referred to as "pixels") that each independently perform a photoelectric conversion, and at least one photoelectric conversion area is allocated per minimum area provided to each of the phase adjuster 110 and the detector 120. The photoelectric convertor 130 according to this embodiment includes a plurality of photodiodes (PDs). This embodiment allocates one PD for each minimum area set to each of the phase adjuster 110 and the detector 120. However, two PDs or more may be allocated for each minimum area.

The polarized component that has transmitted through the detector 120 is converted into an electric signal by the photoelectric convertor 130 and electronically processed. The sensor 100 has one-dimensionally or two-dimensionally divided areas as pixels and is configured to calculate polarization information of the incident light IL based on information acquired for each pixel.

The controller 140 includes, for example, a microcomputer and controls components of the sensor 100. An output (analog electric signal) from the photoelectric convertor 130 is converted into a digital signal by an A/D converter (not illustrated). The A/D converter (not illustrated) may be integrated with the photoelectric convertor 130.

The controller 140 may estimate the polarization information of the incident light IL based on this digital signal. In this case, the memory (storage unit) 160 stores a relationship between the polarization state of the incident light and the output of the photoelectric convertor 130, such as information in FIG. 4 described later. The controller 140 identifies the polarization state (intensity and phase) of the incident light IL based on an actual output of the photoelectric convertor 130 and the information stored in the memory 160. The controller 140 may correct an amplitude intensity based on an output intensity from the photoelectric convertor 130 as described later.

The display unit 150 includes, for example, a liquid crystal display and can display various kinds of setting information, state information, and control information of the sensor 100, as well as polarization information (phase information and intensity information) of the incident light IL identified by the controller 140. Alternatively, the display unit 150 may display information of the output of the photoelectric convertor (in the "Output" columns in tables illustrated in FIG. 4 described later).

The controller 140, the display unit 150, and the memory 160 may be provided outside the sensor 100.

Assume that light transmitted through the phase adjuster 110 is the linear polarization light LPL1 or the counterclockwise circular polarization light CPL1. Also assume that the detector 120 only transmits light oscillating in the Y direction. Then, the linear polarization light LPL1 and the circular polarization light CPL1 have an identical amplitude and oscillate in the Y direction. Although the phases of these polarization light fluxes are shifted from each other by π/2, the photoelectric convertor 130 cannot acquire this phase information and only the incident light amount and intensity are recorded. Thus, it cannot be determined whether the incident light IL is the circular polarization light or the linear polarization light.

Figure 3:
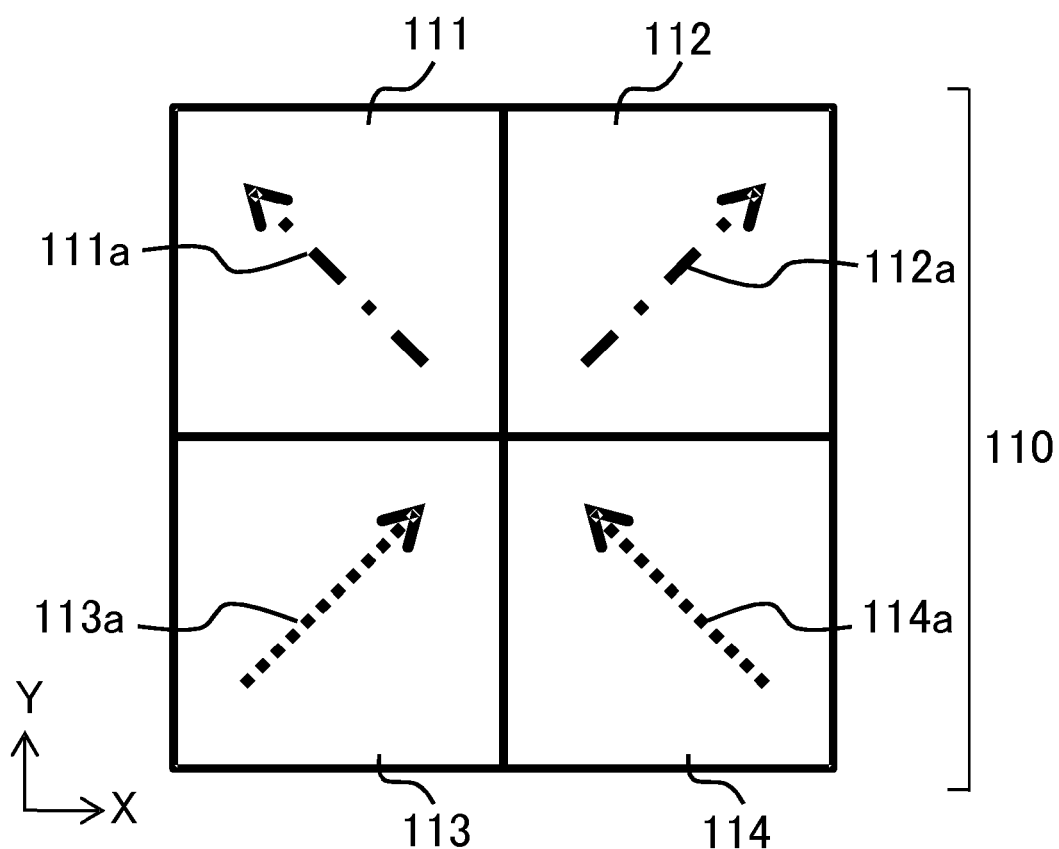
FIG. 3 is a plan view illustrating an exemplary configuration of a phase adjuster illustrated in FIG. 1 according to Embodiment 1.

FIG. 3 is a plan view illustrating an exemplary configuration of the phase adjuster 110. The phase adjuster 110 has at least three areas, and has four areas 111 to 114 in this embodiment. Arrows 111a to 114a indicate the directions of slow axes.

When the phase adjuster 110 has only two areas or less, the phase adjuster 110 cannot identify the polarization state of the incident light IL. An exemplary configuration of three areas includes an area 1 having a first phase adjusting amount A1 and a first slow axis whose direction is represented by D1, an area 2 having the first phase adjusting amount A1 and a second slow axis whose direction is represented by D2, and an area 3 having a second phase adjusting amount A2 and a third slow axis whose direction is represented by D3 (the direction D3 may be identical to the directions D1 and D2).

The at least three areas of the phase adjuster 110 have at least two phase adjusting amounts different from each other, thereby statically identifying the polarization state of the incident light IL. In FIG. 3, the areas 111 and 112 serve as quarter-wave plates as illustrated by dashed lines, and the areas 113 and 114 serve as a half-wave plate as illustrated by dotted lines. A quarter-wave plate is a birefringent element that produces a phase difference of 90 degrees between two polarized components orthogonal to each other, and a half-wave plate is a birefringent element that produces a phase difference of 180 degrees between two polarized components orthogonal to each other. This embodiment uses two kinds of wavelength plates (the quarter-wave plate and the half-wave plate) in the areas 111 to 114, but the present invention is not limited this embodiment and may use other wavelength plates (3/2-wave plate and 1/8-wave plate, for example).

The area 111 serves as a quarter-wave plate whose slow axis is angled at 135 degrees with respect to the X axis, and the area 112 serves as a quarter-wave plate whose slow axis is angled at 45 degrees with respect to the X axis. The area 113 serves as a half-wave plate whose slow axis is angled at 45 degrees with respect to the X axis, and the area 114 serves as a half-wave plate whose slow axis is angled at 135 degrees with respect to the X axis.

The at least three areas of the phase adjuster 110 include at least two areas having identical phase adjusting amounts and having slow axes whose directions are different from each other by 20 to 160 degrees inclusive. In FIG. 3, the areas 111 and 112 have identical phase adjusting amounts and have slow axes whose directions 111a and 112a are different from each other by 90 degrees, and the areas 113 and 114 have identical phase adjusting amounts and have slow axes whose directions 113a and 114a are different from each other by 90 degrees.

In FIG. 3, the slow axis direction 111a and the slow axis direction 112a are different from each other by 90 degrees. Similarly, the slow axis direction 113a and the slow axis direction 114a are different from each other by 90 degrees. The lower limit of the angle difference between slow axis directions is set based on a minimum angle difference of 45/2 degrees=22.5 degrees, which is useful in polarization detection, and a manufacturing error with which the polarization state can be identified. The upper limit of the angle difference is set to 90 degrees because the angle between two slow axes is typically expressed as the absolute value of an acute angle or right angle.

The phase adjuster 110 is divided into a plurality of areas 111 to 114, and an identical polarization light flux incident on each of the areas 111 to 114 is emitted in different polarization state even when the same polarized light is incident upon each area. For example, when light oscillating in the Y direction is incident on the phase adjuster 110, the area 111 emits a counterclockwise circular polarization light, the area 112 emits a clockwise circular polarization light, and the areas 113 and 114 emit linear polarization lights oscillating in the X direction. Each of a plurality of photoelectric conversion areas in the photoelectric convertor 130 is allocated to each area of the phase adjuster 110 illustrated in FIG. 3.

FIG. 4 illustrates shapes (in the "post-phase adjustment" column) of polarization light fluxes emitted from the areas of the phase adjuster 110 when a polarization light flux is incident on the phase adjuster 110, and the amplitude intensity (in the "output" column) when the detector 120 detects a polarized component in the Y direction. The polarization light flux incident on the phase adjuster 110 contains a vertically polarization light flux, a horizontally polarization light flux, a counterclockwise circular polarization light, and a clockwise circular polarization light. Herein, the described intensity is the amplitude intensity, and an energy intensity actually acquired by the photoelectric convertor 130 is obtained by squaring the amplitude intensity.

The areas 111 and 112 are quarter-wave plates, and convert an incident linear polarization light into circular polarization light and an incident circular polarization light into linear polarization light. The areas 113 and 114 are half-wave plates, and change the oscillating direction of an incident linear polarization light while maintaining its linear polarization, and change a rotational direction of an incident circular polarization light. The detector 120 picks up the Y-polarized component of a polarization light flux transmitted through the phase adjuster 110, can estimate the oscillating direction of the incident light. For example, it is understood that incident polarization light is a vertically polarization light flux when values of the detector 120 are zero for the areas 113 and 114. The controller 140 may acquire the output information illustrated in FIG. 4, and display polarization information of the incident light IL on the display unit 150. The polarization information may be displayed in text, figure, symbol, etc.

This embodiment calculates the intensity and phase of a polarization light flux based on a correlation value of the intensities acquired by a plurality of pixels in order to improve the accuracy of detecting the polarization light flux. For example, in an attempt to detect the polarization light flux only with the area 111, only an output of a counterclockwise circular polarization light becomes zero and thus the counterclockwise circular polarization light can be detected. However, the polarization state cannot be identified for vertically and horizontally polarization light fluxes and a clockwise circular polarization light. When the correlation value of outputs of the areas 111 to 114 is used, at least these four polarization states can be estimated.

The literature disclosed in Yoneyama et al. supra. is configured as if all areas of the phase adjuster 110 are quarter-wave plates. Then, due to half information illustrated in FIG. 4, the detecting accuracies of linear polarization light and phase information become lower.

The intensity may also be electronically estimated in accordance with a polarization state identified based on the correlation of the outputs of the areas 111 to 114. As illustrated in FIG. 4, for example, the vertically polarization light flux and the clockwise circular polarization light have an identical amplitude intensity, but their outputs vary between 7 and 14. Thus, the amplitude intensity of the incident polarized component is not necessarily proportional to the output intensity in the sensor 100.

Thus, the controller 140 acquires information of the amplitude intensities of two linearly polarized components of the incident light IL based on the output (intensity) of the photoelectric convertor 130. First, the controller 140 acquires the phase information of the two linearly polarized components of the incident light IL. In the upper-left example in FIG. 4, the controller 140 acquires information of an output of "7, 7, 0, 0" of the photoelectric convertor 130, and hence acquires information indicating that the incident light IL is a Y-polarization light flux. Next, the controller 140 acquires information of the amplitude intensities (X:Y=0:10) of the two linearly polarized components of the incident light IL based on the information indicating the Y-polarization light flux and the output of "7, 7, 0, 0" of the photoelectric convertor 130. Then, the controller 140 uses the information in FIG. 4 previously stored in the memory 160, and acquires the amplitude intensity of "10" based on the output of "7". The controller 140 may display this result on the display unit 150.

Figure 5:
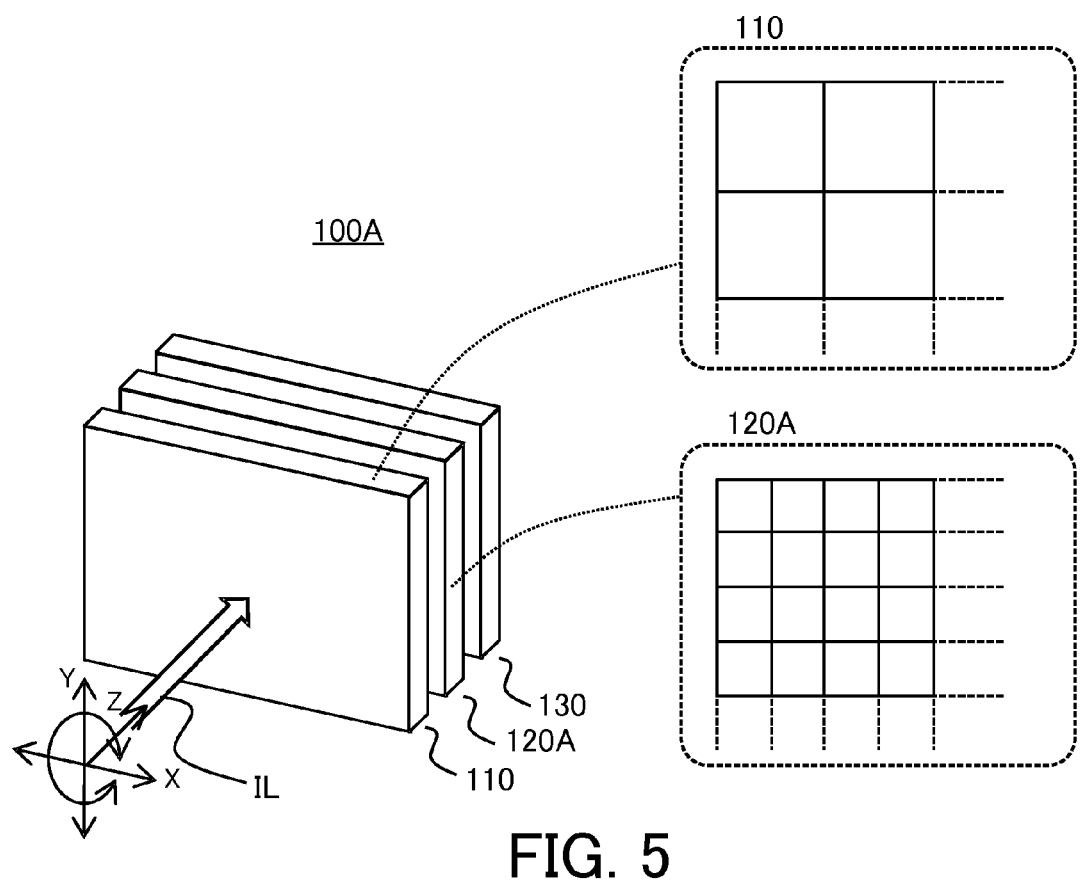
FIG. 5 is a schematic perspective diagram of a sensor as a variation of the sensor illustrated in FIG. 1.

FIG. 5 is a schematic perspective diagram of a sensor 100A in which the detector has a plurality of areas, and at least two areas of the detector are allocated to each area of the phase adjuster 110. FIG. 5 omits the controller 140 and other components.

In FIG. 5, a detector 120A has a plurality of areas each including a polarizer that transmits an incident light polarized component oscillating in one direction, and does not transmit but reflects or absorbs an incident light polarized component oscillating in a direction orthogonal to the transmitting polarized component. The at least two areas of the detector 120A that are allocated to each area of the phase adjuster 110 transmit polarized components oscillating in different directions. This configuration improves the accuracy of detecting the polarization state of the incident light IL.

FIG. 5 also illustrates a partial plan view of the phase adjuster 110 and a partial plan view of the detector 120A. In this embodiment, four areas of the detector 120A are allocated to each area of the phase adjuster 110. In FIG. 5, the area of the detector 120A are smaller than the area of the phase adjuster 110, and thus each photoelectric conversion area of the photoelectric convertor 130 is allocated to each area of the detector 120A.

FIG. 6 illustrates an exemplary analysis of incident polarization light by the detector 120A with this configuration. The incident polarization light is incident on the detector 120A. The output depends upon the incident linear polarization light and an analysis direction of the detector 120A. For example, when the incident polarization light is linear polarization light, angles of the linear polarization light with respect to the X and Y axes can be deduced from intensities obtained in the area where the Y-polarized component is analyzed and the area where the X-polarized component is analyzed. This correlation of the outputs enables the controller 140 to highly accurately acquire the polarization state of the incident light IL.

The output does not change for circular polarization light irrespective of a direction of the detector 120A. This is because the amplitude does not change with the oscillating direction. For example, when a non-polarization light flux enters the detector 120A, the outputs becomes identical for all analysis directions. Accordingly, the phase adjuster 110 is used to distinguish the non-polarization light flux and the circular polarization light from each other. This allows not only the polarization intensity but also the phase difference information for each polarization light flux to be acquired.

In FIG. 1, the direction of the fast axis or slow axis of the phase adjuster 110 is different from the transmitting direction of the polarized light of the detector 120. In FIG. 3, the directions of the fast and slow axes of the areas 111 to 114 of the phase adjuster 110 are angled at 45 degrees with respect to the Y axis as the transmitting direction of the detector 120.

When the fast axis or the slow axis is aligned with the Y axis direction, the phase of a polarization light flux oscillating in this direction merely changes. On the other hand, the detector 120 and the photoelectric convertor 130 cannot acquire the phase information. Thus, even when the fast axis or the slow axis of the phase adjuster 110 is aligned with the transmitting direction of the detector 120, the polarized light transmitted through the detector 120 does not change the intensity. Hence, the transmitting direction of the polarized light of the detector 120 is set to be different from the direction of the fast axis or slow axis of the phase adjuster 110.

An angle α between the transmitting direction of the polarized light of the detector 120 and the fast axis or slow axis of the phase adjuster 110 may be between 10 degrees and 80 degrees inclusive or between 15 to 75 degrees inclusive. The angle α out of this range may cause an intensity difference of the X- and Y-polarized components to be 1/10 or less of the intensity of the incident light IL, lowering the accuracy of detecting the polarization state.

The condition that the fast axis or slow axis of the phase adjuster 110 is different from the transmitting direction of the polarized light of the detector 120 is not necessarily required as in FIG. 6.

Assume that $\alpha_1$ and $\alpha_2$ denote angles of the slow axes of the two areas of the phase adjuster 110 that serve as half-wave plates with respect to the transmitting direction of the polarized light of the detector 120, and β denotes an angle of the slow axis of the area of the phase adjuster 110 that serves as a quarter-wave plate with respect to the transmitting direction of the polarized light of the detector 120. When $\alpha_1$, $\alpha_2$, and β are values in a range of 0 to 90 degrees, Expression (1) below may be satisfied.

$$0.7 < |\sin(\alpha_1 + \alpha_2) \cdot \sin 2\beta| \leq 1 \quad (1)$$

When Expression (1) is satisfied, both $\sin(\alpha_1+\alpha_2)$ and $\sin 2\beta$ are close to 1. The values of $\alpha_1$ and $\alpha_2$ can be used to calculate a ratio of the amplitude intensities of the two linearly polarized components of the incident light IL that are orthogonal to each other (the amplitude intensities of the components oscillating in the X and Y directions of the phase adjuster 110 illustrated in FIG. 4).

Since the transmission axis of the detector 120 has no directionality, $\alpha_1$ and $\alpha_2$ are acute angles. Thus, the value of $\sin(\alpha_1+\alpha_2)$ being close to 1 means that a sum of $\alpha_1$ and $\alpha_2$ is close to 90 degrees. Now assume that $\alpha_1+\alpha_2=90$ degrees below.

A half-wave plate rotates linear polarization light while maintaining its linear polarization. When A denotes an angle between the oscillating direction of the incident polarization light and the transmitting direction of the polarized light of the detector 120, the incident polarization light being transmitted through the half-wave plate having the angle $\alpha_1$ with respect to the slow axis is emitted as linear polarization light oscillating at an angle of $2\alpha_1-A$. Similarly, the incident polarization light being transmitted through the half-wave plate having the angle $\alpha_2$ with respect to the slow axis is emitted as linear polarization light oscillating at an angle of $2\alpha_2-A$. These linear polarization lights travelling through the detector 120 have amplitude intensities given by the cosines of the angles of the oscillating directions of the linear polarization lights. In other words, the linear polarization light transmitted through the half-wave plate having the angle $\alpha_1$ with respect to the slow axis has an amplitude intensity of $\cos(2\alpha_1-A)$, and the linear polarization light transmitted through the half-wave plate having the angle $\alpha_2$ with respect to the slow axis has an amplitude intensity of $\cos(2\alpha_2-A)$. Due to $\alpha_2=90-\alpha_1$ degrees, this expression can be rewritten as $\cos(180-2\alpha_1-A)=-\cos(2\alpha_1+A)$. Since the intensity does not have a sign, the amplitude intensity of the linear polarization light transmitted through the half-wave plate having the angle $\alpha_1$ with respect to the slow axis is given by $\cos(2\alpha_1-A)$, and the amplitude intensity of the linear polarization light transmitted through the half-wave plate having the angle $\alpha_2$ with respect to the slow axis is given by $\cos(2\alpha_1+A)$. With the addition theorem of cosines, the former can be rewritten as $\cos(2\alpha_1-A)=\cos 2\alpha_1 \times \cos A + \sin 2\alpha_1 \times \sin A$, and the latter as $\cos(2\alpha_1+A)=\cos 2\alpha_1 \times \cos A - \sin 2\alpha_1 \times \sin A$. Since $\alpha_1$ is known, cos A and sin A can be deduced by these two equations. The cos A and sin A of linear polarization light oscillating in the direction of the angle A respectively correspond to the amplitude intensities of light oscillating in the X and Y directions. Thus, the use of $\alpha_1$ and $\alpha_2$ substantially satisfying $\alpha_1+\alpha_2=90$ degrees allows the amplitude intensities of components of an incident linear polarization light that oscillate in the X and Y directions to be deduced.

On the other hand, when $\alpha_1$ and $\alpha_2$ that do not satisfy Expression (1) are used, one of the amplitude intensities of the incident polarization light in the X and Y directions cannot be calculated, even if the other of the amplitude intensities can be calculated.

A quarter-wave plate converts an incident circular polarization light into linear polarization light oscillating in a direction angled at 45 degrees with respect to its slow axis. The quarter-wave plate satisfying Expression (1) has an angle of the slow axis close to 45 degrees. The use of such a quarter-wave plate allows an incident circular polarization light to be converted into linear polarization lights parallel and orthogonal to the transmission axis of the detector 120. This enables efficient detection of the circular polarization light.

When the angle β of the quarter-wave plate satisfies Expression (1), the incident light IL is converted into a polarization light flux in the transmission direction of the detector 120 or in a direction orthogonal thereto depending on the rotational direction of the phase of the incident light IL. Thus, transmission and blocking widths of the detector 120 can be increased to acquire phase information.

As described above, Expression (1) may be satisfied to accurately detect circular polarization light and linear polarization light as the incident polarization lights IL and to achieve a large SN ratio.

The phase adjuster 110 may be made of various kinds of materials having optical anisotropy. The phase adjuster 110 may be made of a crystalline material such as crystal and calcite, or anisotropy resin such as a stretched film, for example. There is also an anisotropic material having a structure finer than the wavelength of the incident light IL, which is the working wavelength. In such a structure finer than the wavelength of the incident light IL, light is not affected by the structure and behaves as if it is in a uniform medium. This phenomena is known as structural anisotropy, and depends on intervals within the structure, the filling factor of the material, and the refractive index of the material.

Figure 7A:
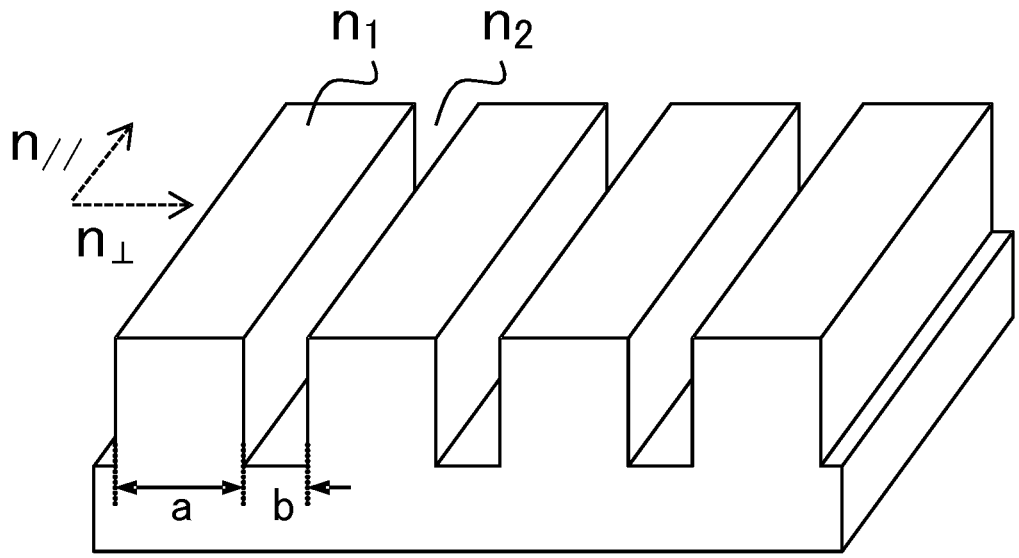
FIG. 7A is a perspective diagram for explaining structural anisotropy of the phase adjuster illustrated in FIG. 1.

FIG. 7A illustrates an exemplary structure having the structural anisotropy. In a rectangle lattice having a filling factor f of a/(a+b) in which media having refractive indices $n_1$ and $n_2$ for light having a wavelength of 550 nm are repeatedly arranged in a ratio of a:b, $n_\parallel$ and $n_\perp$ are given by Expressions (2) and (3) below where the refractive index in a direction parallel to the lattice is represented by $n_\parallel$, and the refractive index in a direction orthogonal to the lattice is represented by $n_\perp$.

In FIG. 7A, the phase adjuster 110 has a rectangular lattice structure in which a first medium having a width of a and a second medium having a width of b, both having an identical height and an identical length, are alternately arranged, where a and b are smaller than the working wavelength.

$$n_\parallel = \sqrt{\frac{an_1^2 + bn_2^2}{a+b}} \quad (2)$$

$$n_\perp = \sqrt{\frac{a+b}{a/n_1^2 + b/n_2^2}} \quad (3)$$

Figure 7B:
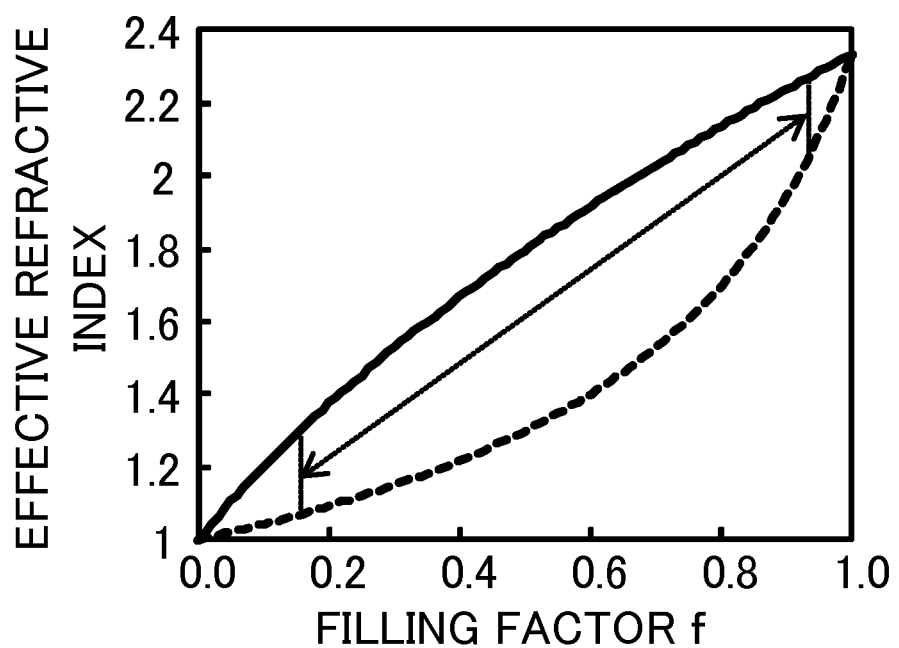
FIG. 7B is a plot of an effective refractive index of against a filling factor f of $TiO_2$.

This arrangement of different structures in different directions achieves different effective refractive index. FIG. 7B plots effective refractive indices $n_\parallel$ and $n_\perp$ (vertical axis) against the filling factor f (horizontal axis) when the medium having the refractive index $n_1$ is dielectric $TiO_2$ ($n_1$=2.335), and the medium having the refractive index $n_2$ is air. A solid line is $n_\parallel$, and a broken line is $n_\perp$.

The filling factor f=0.17 yields $n_\parallel$=1.34 and $n_\perp$=1.08, and the filling factor f=0.52 yields $n_\parallel$=1.85 and $n_\perp$=1.34. The widths a and b being smaller than the working wavelength leads to a significantly large anisotropy.

Such a structural anisotropy can be used to have an anisotropy larger than that obtained with a normal anisotropic material. For example, $TiO_2$ having a physical thickness of 515 nm serves, when having the structural anisotropy with f=0.17, as a quarter-wave plate for light having a wavelength of 550 nm, and when having the structural anisotropy with f=0.52, as a half-wave plate for light having a wavelength of 550 nm. This has the advantage of producing an extremely thin anisotropic plate.

The phase adjusting amount can be adjusted also by changing the filling factor f while maintaining the thickness. In this embodiment, the areas 111 to 114 of the phase adjuster 110 each have a constant thickness in the optical axis direction, which prevents unnecessary diffraction due to reflection at any step as a thickness difference. This also provides the sensor 100 with a flat surface, which facilitates laminating, for example, a cover glass or a lowpass filter thereto.

The filling factor f may be between 0.1 and 0.7 inclusive. As illustrated in FIG. 7B, when the physical thickness is 515 nm for example, a quarter-wave plate can be obtained at f=0.17 and f=0.92. However, for f being 0.7 or more, $n_1$ changes extremely largely with the filling factor f, making the sensitivity of the phase adjuster 110 too high. On the other hand, the use of a structure with f being 0.7 or less achieves a small refractive index of a material forming the lattice. The sensor 100 includes the phase adjuster 110 disposed closest to the incident light IL, and the refractive index of an outermost material may be as low as possible to prevent any reflection of the incident light. Thus, the filling factor f may be 0.7 or less. Any f value lower than this lower limit is not preferable because the value indicates an insufficient amount of the dielectric, which leads to an unstable structure.

An element with the structural anisotropy can be manufactured by, for example, forming and transferring of a mask pattern by dual beam interference, or injection molding by nanoimprint, but is not limited thereto.

Embodiment 1

Embodiment 1 has a configuration illustrated in FIG. 3 in which the incident light IL has the working wavelength λ of 550 nm, and the phase adjuster 110 is made of crystal. Thus, the areas 111 to 114 have at least two kinds of phase adjusting amounts. The areas 111 to 114 include at least two areas having an identical phase adjusting amount and having slow axes whose directions are different from each other. The areas 111 to 114 also include at least two areas having slow axes whose directions are different from each other by 20 to 90 degrees inclusive. The areas 111 and 112 serve as quarter-wave plates as illustrated by dashed lines, and the areas 113 and 114 serve as half-wave plates as illustrated by dotted lines.

Crystal has refractive indices no=1.5462 and ne=1.5553 for light having a wavelength of 550 nm. The areas 111 and 112 have axis directions 605 and 606 of the ne and thicknesses of 15 μm. The areas 113 and 114 have axis directions 607 and 608 of the ne and thicknesses of 30 μm. With this configuration, $α_1$, $α_2$, and β are 45 degrees, and thus the right hand side of Expression (1) is equal to one for the phase adjuster 110, and Expression (1) is satisfied. Outputs of the polarization light flux IL incident on the phase adjuster 110 are as illustrated in FIG. 4. The controller 140 can acquire and output the polarization information of the incident light IL based on these four kinds of outputs.

Embodiment 2

Figure 8:
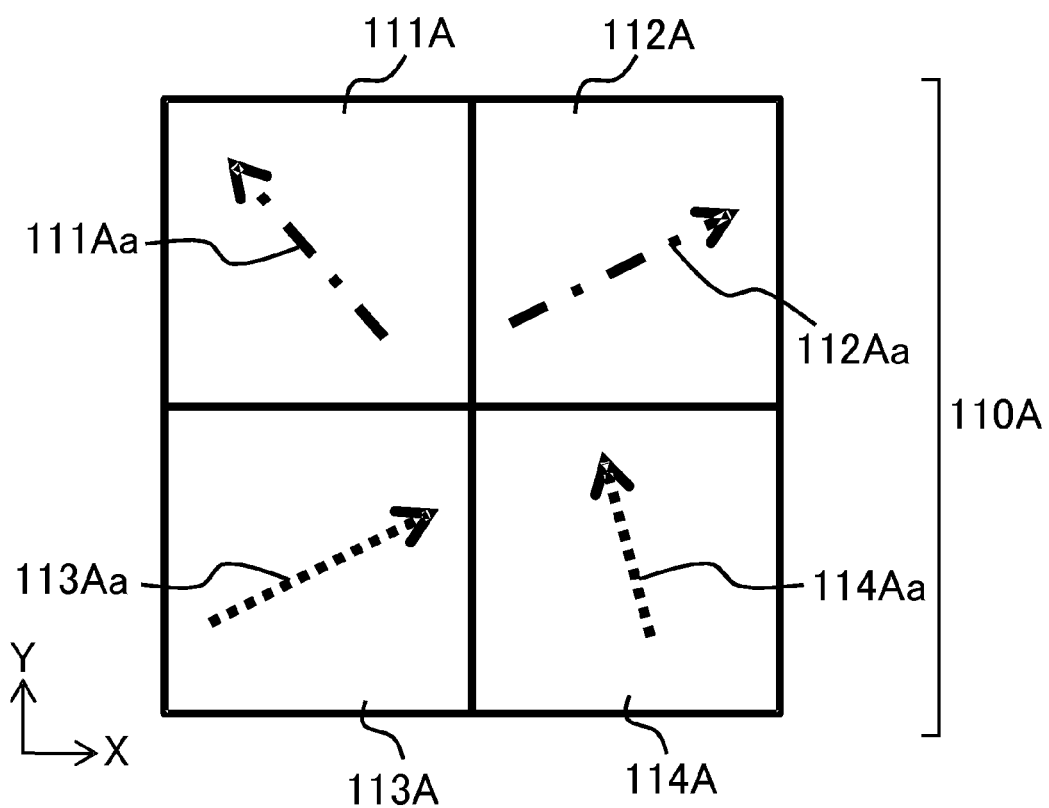
FIG. 8 is a plan view illustrating another exemplary configuration of the phase adjuster illustrated in FIG. 1 according to Embodiment 2.

Embodiment 2 has a configuration in which the incident light IL has the working wavelength λ of 550 nm, and a phase adjuster 110A whose areas are arranged as illustrated in FIG. 8 is included. The phase adjuster 110A has four areas 111A to 114A. Arrows 111Aa to 114Aa indicate the directions of slow axes thereof.

The areas 111A to 114A have at least two kinds of phase adjusting amounts. The areas 111A to 114A include at least two areas having an identical phase adjusting amount and having slow axes whose directions are different from each other. The areas 111A to 114A also include at least two areas having slow axes whose directions are different from each other by 20 to 90 degrees inclusive. The areas 111A and 112A serve quarter-wave plates as illustrated by dashed lines, and the areas 113A and 114A serve as a half-wave plates as illustrated by dotted lines.

The area 111A serves as a quarter-wave plate having a slow axis angled at 120 degrees with respect to the X axis, and the area 112A serves as a quarter-wave plate having a slow axis angled at 30 degrees with respect to the X axis. The area 113A serves a half-wave plate having a slow axis angled at 30 degrees with respect to the X axis, and the area 114A serves as a half-wave plate having a slow axis angled at 105 degrees with respect to the X axis.

The areas 111A to 114A are produced by utilizing the structural anisotropy of $TiO_2$. The areas 111A and 112A serving as quarter-wave plates have the filling factor f of 0.17, and the areas 113A and 114A serving as half-wave plates have the filling factor f of 0.52. All areas have a physical thickness of 515 nm. The angles $\alpha_1$ of 15 degrees, $\alpha_2$ of 60 degrees, and $\beta$ of 30 degrees give 0.84 for the right hand side of Expression (1), and thus Expression (1) is satisfied.

FIG. 9 lists shapes representing polarization light fluxes emitted from the areas of the phase adjuster 110A when a polarization light flux is incident on the phase adjuster 110A, and the amplitude intensities of a Y-polarization light flux detected by the detector 120. The incident polarization light has six polarization states. A comparison of the amplitude intensities output from the areas 111A and 112A shows that any difference between these intensities indicates that the incident polarization light is circular polarization light. The difference between the amplitude intensities output from the areas 113A and 114A can be used to deduce the ratio of the amplitude intensities of linear polarization light in the X and Y directions. Equal intensities of the areas 113A and 114A indicate that the amplitudes of polarization light fluxes oscillating in the X and Y directions are equal. Furthermore, since a phase amount can be calculated based on a difference between an output from a quarter-wave plate and an output from a half-wave plate, the oscillating direction of a diagonally polarization light flux can be calculated.

In this embodiment, the polarization direction of the incident light can be calculated based on the correlation of the output intensities. Although the phase adjuster 110A has four output values, at least six polarization states can be estimated based on combinations of these four out values, and it is advantageous that more polarization states than the output values can be estimated.

Embodiment 3

Figure 10:
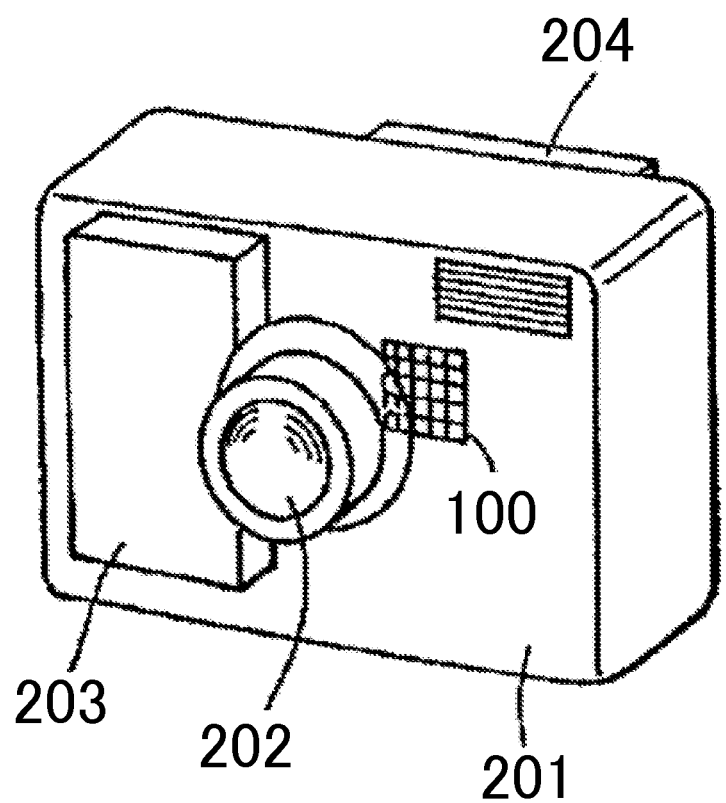
FIG. 10 is a perspective diagram of a digital camera (image pickup apparatus) including the sensor illustrated in FIG. 1 according to Embodiment 3.

FIG. 10 is a perspective diagram of a digital camera (image pickup apparatus) 200 including the sensor 100. A camera body 201 is provided with an image-pickup optical system 202 and includes the sensor 100. In FIG. 10, the sensor 100 does not include the controller 140, the display unit 150, and the memory 160.

A controller (not illustrated) provided to the camera body 201 serves as the controller 140. The photoelectric convertor 130 also serves as an image sensor and photoelectrically converts an optical image of an object that is formed through the image-pickup optical system 202. Reference numeral 203 denotes a memory (storage unit) that records information of an object image photoelectrically converted by the image sensor, and serves as the memory 160. Reference numeral 204 denotes a display unit such as liquid crystal panel and serves as the display unit 150. This configuration including the sensor 100 allows detection of the polarization state of the object image formed through the image-pickup optical system 202.

The functionalities of the controller 140, the display unit 150, and the memory 160 of the sensor 100 may be achieved by a personal computer (PC). In this case, the digital camera 200 is connected to the PC through, for example, a USB cable, and image information of an image captured by the image sensor is stored in a storage unit such as a HDD in the PC. A CPU of the PC serves as the controller 140, and a display thereof serves as the display unit 150. The HDD stores the information listed in FIG. 4 and software (program) that causes the CPU to execute a polarization information acquisition method. This configuration enables the CPU of the PC to acquire the polarization information (phase and intensity) of the incident light IL.

Each of the embodiments can provide a polarization information acquisition unit, an image pickup apparatus, a polarization information acquisition method, and a non-transitory computer-readable storage medium that are capable of statically and highly accurately acquiring polarization information of linear polarization light and circular polarization light in a short time.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the serves of one or more of the above-described embodiment (s) and/or that includes one or more circuits (e.g., application specific integrated circuit (ASIC)) for performing the serves of one or more of the above-described embodiment (s), and by a method performed by the computer of the system or apparatus by, for example, reading out and executing the computer executable instructions from the storage medium to perform the serves of one or more of the above-described embodiment(s) and/or controlling the one or more circuits to perform the serves of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and serves.

This application claims the benefit of Japanese Patent Application No. 2014-046131, filed on Mar. 10, 2014, which is hereby incorporated by reference wherein in its entirety.

What is claimed is:

1. An polarization information acquisition unit configured to acquire polarization information of incident light, the polarization information acquisition unit comprising:
  a phase adjuster configured to adjust phases of two linearly polarized components of the incident light, which oscillate in directions orthogonal to each other;
  a detector configured to transmit a polarized component oscillating in one direction and not to transmit a polarized component oscillating in a direction orthogonal to the one direction, the polarized components being included in light emitted from the phase adjuster; and
  a photoelectric convertor configured to photoelectrically convert a polarized component transmitted through the detector,
  wherein the phase adjuster has at least three areas, and
  wherein the at least three areas include at least two areas having phase adjusting amounts different from each other, and at least two areas having an identical phase adjusting amounts and having slow axes whose directions are different from each other by 20 to 90 degrees inclusive.

2. The polarization information acquisition unit according to claim 1, wherein the photoelectric convertor has a plurality of photoelectric conversion areas, each of which independently performs a photoelectric conversion, and at least one photoelectric conversion area is allocated for each minimum area set to each of the phase adjuster and the detector.

3. The polarization information acquisition unit according to claim 1, further comprising:
  a controller configured to acquire phase information of the two linearly polarized components of the incident light based on an output from the photoelectric convertor.

4. The polarization information acquisition unit according to claim 3, wherein the controller acquires information of amplitude intensities of the two linearly polarized components of the incident light based on the phase information of the two linearly polarized components of the incident light and the output from the photoelectric convertor.

5. The polarization information acquisition unit according to claim 1, wherein the detector has one area that transmits a polarized component of the incident light that is oscillating in one direction and does not to transmit a polarized component oscillating in a direction orthogonal to a transmitting polarized component.

6. The polarization information acquisition unit according to claim 1,
  wherein the detector has a plurality of areas, each of which transmits a polarized component of the incident light that is oscillating in one direction and do not transmit a polarized component oscillating in a direction orthogonal to a transmitting polarized component, and
  wherein at least two areas of the detector are allocated to each area of the phase adjuster and transmit polarized components oscillating in directions different from each other.

7. The polarization information acquisition unit according to claim 1, wherein a transmitting direction of the detector of polarized light is different from a direction of a fast axis or a slow axis of the phase adjuster.

8. The polarization information acquisition unit according to claim 1, wherein at least three areas of the phase adjuster include an area serving as a half-wave plate and an area serving as a quarter-wave plate.

9. The polarization information acquisition unit according to claim 8, wherein an expression below is satisfied:

$$0.7 < |\sin(\alpha_1 + \alpha_2) \cdot \sin 2\beta| \leq 1$$

for $\alpha_1$, $\alpha_2$, and $\beta$ in a range of 0 to 90 degrees, where $\alpha_1$ and $\alpha_2$ respectively represent angles of slow axes of two areas of the phase adjuster that each serve as the half-wave plate with respect to a transmitting direction of polarized light of the detector, and $\beta$ represents an angle between a slow axis of the area of the phase adjuster that serves as a quarter-wave plate and the transmitting direction of the polarized light of the detector.

10. The polarization information acquisition unit according to claim 1, wherein the phase adjuster has a rectangular lattice structure in which a first medium having width a and a second medium having width b are alternately arrayed, the first medium and the second medium having identical heights and identical lengths, and the widths a and b being smaller than a wavelength of the incident light.

11. The polarization information acquisition unit according to claim 10, wherein
  the first medium is dielectric, the second medium is air, and a filling factor of the dielectric given by a/(a+b) is between 0.1 and 0.7 inclusive.

12. The polarization information acquisition unit according to claim 1, wherein the at least three areas of the phase adjuster have identical thicknesses in an optical axis direction.

13. The polarization information acquisition unit according to claim 1, further comprising:
  a display unit configured to display information of an output from the photoelectric convertor.

14. The polarization information acquisition unit according to claim 3, further comprising:
  a display unit configured to display the phase information of the incident light acquired by the controller.

15. The polarization information acquisition unit according to claim 4, further comprising:
  a display unit configured to display information of the amplitude intensity of the incident light acquired by the controller.

16. An image pickup apparatus comprising:
  a camera body, and
  a polarization information acquisition unit configured to acquire polarization information of incident light, the polarization information acquisition unit comprising:
    a phase adjuster configured to adjust phases of two linearly polarized components of the incident light, which oscillate in directions orthogonal to each other;
    a detector configured to transmit a polarized component oscillating in one direction and not to transmit a polarized component oscillating in a direction orthogonal to the one direction, the polarized components being included in light emitted from the phase adjuster; and
    a photoelectric convertor configured to photoelectrically convert a polarized component transmitted through the detector,
    wherein the phase adjuster has at least three areas, and
    'wherein the at least three areas include at least two areas having phase adjustinq amounts different from each other, and at least two areas having an identical phase adjustinq amounts and having slow axes whose directions are different from each other by 20 to 90 degrees inclusive.

17. A polarization information acquisition method executed by a computer, the method comprising acquiring, based on a relationship between a polarization state of incident light and an output from the photoelectric convertor of the polarization information acquisition unit and an actual output from the photoelectric convertor, phase information of two linearly polarized components of light incident on the polarization information acquisition unit and information of amplitude intensities of the two linearly polarized components,
  wherein the polarization information acquisition unit includes a phase adjuster configured to adjust phases of two linearly polarized components of the incident light, which oscillate in directions orthogonal to each other;
  a detector configured to transmit a polarized component oscillating in one direction and not to transmit a polarized component oscillating in a direction orthogonal to the one direction, the polarized components being included in light emitted from the phase adjuster; and
  a photoelectric convertor configured to photoelectrically convert a polarized component transmitted through the detector,
  wherein the phase adjuster has at least three areas, and
  wherein the at least three areas include at least two areas having phase adjusting amounts different from each other, and at least two areas having an identical phase adjusting amounts and having slow axes whose directions are different from each other by 20 to 90 degrees inclusive.

18. A non-transitory computer-readable storage medium storing a program that causes a computer to execute a polarization information acquisition method,
  wherein the method comprising acquiring, based on a relationship between a polarization state of incident light and an output from the photoelectric convertor of the polarization information acquisition unit and an actual output from the photoelectric convertor, phase information of two linearly polarized components of light incident on the polarization information acquisition unit and information of amplitude intensities of the two linearly polarized components,
  wherein the polarization information acquisition unit includes a phase adjuster configured to adjust phases of two linearly polarized components of the incident light, which oscillate in directions orthogonal to each other;
  a detector configured to transmit a polarized component oscillating in one direction and not to transmit a polarized component oscillating in a direction orthogonal to the one direction, the polarized components being included in light emitted from the phase adjuster; and
  a photoelectric convertor configured to photoelectrically convert a polarized component transmitted through the detector,
  wherein the phase adjuster has at least three areas, and
  wherein the at least three areas include at least two areas having phase adjusting amounts different from each other, and at least two areas having an identical phase adjusting amounts and having slow axes whose directions are different from each other by 20 to 90 degrees inclusive.

* * * * *